(12) United States Patent
Breeuwer et al.

(10) Patent No.: US 7,106,892 B2
(45) Date of Patent: Sep. 12, 2006

(54) DISPLAY OF IMAGE DATA INFORMATION

(75) Inventors: Marcel Breeuwer, Eindhoven (NL); Raja Muthupillai, Pearland, TX (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 641 days.

(21) Appl. No.: 10/247,120

(22) Filed: Sep. 19, 2002

(65) Prior Publication Data
US 2004/0057607 A1 Mar. 25, 2004

(51) Int. Cl.
*G06K 9/00* (2006.01)
*G06K 9/38* (2006.01)
*G06K 9/40* (2006.01)
*G06K 9/36* (2006.01)
*G06K 9/32* (2006.01)

(52) U.S. Cl. .............. 382/128; 382/172; 382/264; 382/283; 382/294

(58) Field of Classification Search ........ 382/128–132, 382/168–172, 264, 282, 283, 294
See application file for complete search history.

(56) References Cited

U.S. PATENT DOCUMENTS

| | | | | |
|---|---|---|---|---|
| 5,289,373 A | * | 2/1994 | Zarge et al. | 600/434 |
| 5,685,305 A | * | 11/1997 | Moonen et al. | 600/419 |
| 5,751,848 A | * | 5/1998 | Farrell | 382/172 |
| 5,871,013 A | | 2/1999 | Wainer | |
| 5,896,463 A | * | 4/1999 | Kuhn | 382/133 |
| 6,043,900 A | * | 3/2000 | Feng et al. | 358/1.9 |
| 6,173,201 B1 | | 1/2001 | Front | |
| 6,222,642 B1 | * | 4/2001 | Farrell et al. | 358/1.9 |
| 6,368,574 B1 | * | 4/2002 | Akeson et al. | 424/9.32 |
| 6,473,634 B1 | | 10/2002 | Barni | |
| 6,493,460 B1 | * | 12/2002 | MacAulay et al. | 382/133 |
| 6,507,670 B1 | * | 1/2003 | Moed | 382/172 |
| 2003/0118232 A1 | * | 6/2003 | Li et al. | 382/170 |

FOREIGN PATENT DOCUMENTS

WO   WO 00/43800   *   7/2000

\* cited by examiner

*Primary Examiner*—Joseph Mancuso
*Assistant Examiner*—Anthony Mackowey

(57) ABSTRACT

A method and workstation for producing a combined image, including information from first and second diagnostic images, identify areas of increased uptake in the second diagnostic image as a region of interest which contains pixels representing the areas of increased uptake. The areas of increased uptake in second diagnostic image are mapped onto equivalent areas in the first diagnostic image using a deviation value calculated from a difference of a first peak position and a second peak position of pixel values of said pixels. The first peak position is a first significant peak of intensity values of the pixels and has a first intensity value, and the second peak position corresponds to a second intensity value which is half the first intensity value.

18 Claims, 2 Drawing Sheets

DISPLAY OF IMAGE DATA INFORMATION

Figure 1:
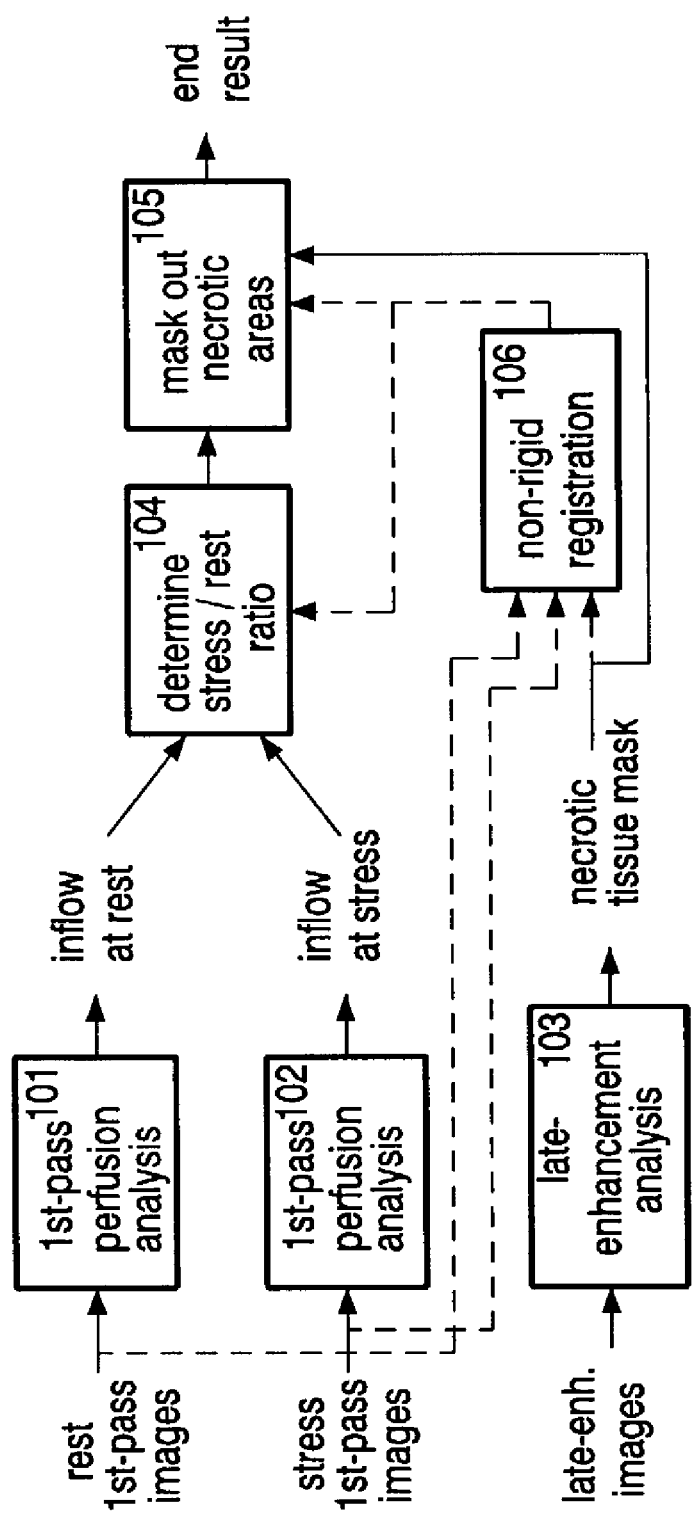

The invention relates to a method of producing a combined image comprising information from a first diagnostic image and a second diagnostic image, where areas of increased uptake are identified in the second diagnostic image.

First-pass myocardial perfusion imaging identifies regions within the myocardium tissue that are insufficiently supplied by blood. As such it provides useful information to the physician that aids him or her in making a reasoned diagnosis taking all other factors into consideration. The general method used to perform such imaging is broadly similar across imaging modalities. A contrast agent is injected and ECG-triggered image is acquired. This image may, for example, be an ECG-triggered magnetic resonance image but the method is also applicable to other modalities. The set of acquired images are used to dynamically view the passage of the contrast agent through the myocardium. The image intensity in the myocardium as a function of time (the time-intensity profile) is a measure for how well blood flows from the coronary arteries into the myocardium. Various parameters have been proposed to quantify the degree of perfusion based on these time-intensity profiles, such as the maximum upslope and the time-to-peak. First-pass perfusion imaging is often performed both when the heart is at rest and when it is stressed. The myocardial perfusion reserve index, i.e. the ratio of the maximum upslope at stress and at rest, is considered to be a good indicator of the degree of perfusion.

First-pass perfusion analysis does not supply information about the viability of myocardial tissue that is insufficiently perfused. This information is supplied by late-enhancement (also denoted as delayed-enhancement) perfusion imaging which is also based on the injection of a contrast agent. Images are acquired after a delay of 15–25 minutes and show an increased uptake of the contrast agent in the non-viable tissue. At present these two types of data are separately visualized and analyzed.

It is an object of the invention to produce an image which provides more accurate and relevant data to the physician and which is simpler to understand.

This is achieved according to the invention by a method characterized in that the areas of increased uptake in second diagnostic image are mapped onto the corresponding areas in the first diagnostic image.

This allows simultaneous analysis of both first pass and late enhancement images.

An embodiment according to the invention produces a combination of 1st-pass and late-enhancement myocardial magnetic resonance images. The 1st-pass perfusion images are first analyzed with a commonly used approach, e.g. for each point or region in the myocardium the ratio of inflow at stress and rest is calculated. For example a sector map may be laid over the 2 dimensional representations of myocardium in each slice taken from the 3 dimensional image data set.

The late-enhancement images are analyzed so that the points or segments containing necrotic tissue are detected. This can also be done on a sector by sector basis. Subsequently, the first-pass and late-enhancement images are non-rigidly registered, so that a geometrical correspondence is available for all locations in the myocardium. The detected necrotic points or segments in the late enhancement study are then used as a mask which is mapped onto the 1st-pass perfusion images and associated quantitative analysis results by means of the derived registration transformation, so that the 1st-pass quantitative analysis results in the necrotic areas can be ignored.

The invention as described allows creation of a composite image which provides important and useful information to the diagnostician who is then assisted in ultimately making a diagnosis. It is confusing and often difficult for the viewing physician to codependantly examine the different images showing essentially different types of information. When the full set of images are shown the clinician may be presented with a full set of images slices representing not only the first pass rest and stress images but also the ratio images providing vital information about the myocardial perfusion and also a full set of late enhancement data indicating areas of necrotic tissue.

It is found in the art that first-pass perfusion analysis generally works well for myocardial areas that are still viable, that is, tissue which is not yet necrotic. For such non-necrotic areas, the ratio of the inflow at stress and at rest is a good indicator for how well these particular areas are perfused. However, for necrotic areas of tissue, the inflow will be low both at rest and at stress. The ratio of these inflows at individual pixels or averaged over individual segments can take a wide range of values, not always representative of the physiological function of that particular volume or section of tissue. In conventionally used 1st-pass perfusion analysis methods this is not taken into account. The method of the invention as described reintroduces diagnostic meaning to these areas of tissue by mapping areas or segments representing this necrotic tissue onto images representing the first pass perfusion.

Figure 2:
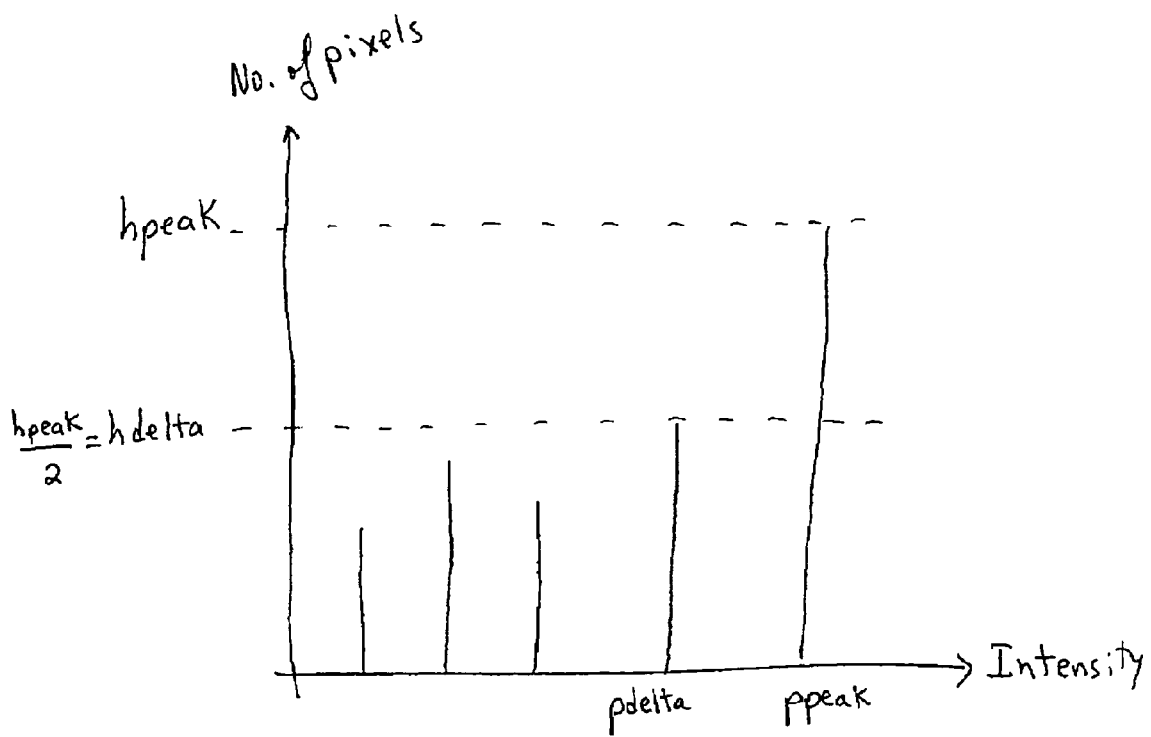

These and other features, aspects, and advantages
of the present invention will become better
understood with regard to the following
description, appended claims, and accompanying
drawings where:

FIG 1 shows a block diagram of an imaging system according to the present invention; and FIG 2 shows a histogram according to the present invention.

FIG 1 shows a block diagram of how the invention may be achieved in practice. The set of images from the initial rest first pass study are subjected to first pass perfusion analysis 101 as known per se in the art. The set of images from the stress first pass study are also subjected to first pass perfusion analysis 102, known as such in the art. Both sets of analyzed data are now used to create a stress/rest ratio image 104 as is known per se in the art. Image data from a late-enhancement study is analyzed 103 according to the invention and a mask of pixels representing areas of high uptake is calculated. A non-rigid registration 106 is performed between all sets of data and the mask is applied to the image representing the stress/rest ratio data 105.

The detection of the pixels which represent high uptake tissue in the late enhancement images can be achieved using an automatic detection algorithm. This is done according to an embodiment of the invention using thresholding which utilizes an automatically derived threshold, comprising the following steps:

all slices are rescaled to the range from 0 to 255 (maximum value is mapped to 255), for each slice the histogram of pixel values in the myocardium is determined, this histogram is severely smoothed to take out the noise, the position ppeak and value hpeak (shown in FIG 2) of the first significant peak in the smoothed histogram are determined (searching from the low to the high pixel values), the position pdelta in the histogram at which the value hdelta is 0.5 times the peak value hpeak is determined, the deviation delta is calculated by taking the absolute value of (ppeak−pdelta), the enhanced-tissue detection threshold is calculated: t =ppeak+2.5*delta, binary thresholding of all pixels in the myocardium is performed using the threshold t.

As such this method is also applicable to other methods of assessing the myocardium and can be used in ultrasound imaging and other modalities such as CT, PET and nuclear medicine.

The invention also relates to a computer program, comprising instructions for the display of images.

A computer program characterized in that it also comprises instructions to produce a combined image comprising information from a first diagnostic image and a second diagnostic image, where areas of increased uptake are identified in the second diagnostic image, the areas of increased uptake in second diagnostic image being mapped onto the equivalent areas in the first diagnostic image has the advantage that it can perform the invention.

The invention also relates to a workstation, configured for the purposes of displaying images.

A workstation characterised in that it also comprises instructions to produce a combined image comprising information from a first diagnostic image and a second diagnostic image, where areas of increased uptake are identified in the second diagnostic image, the areas of increased uptake in second diagnostic image being mapped onto the equivalent areas in the first diagnostic image has the advantage that it can perform the invention.

The application pertains to the diagnosis, planning of treatment and monitoring of ischemic cardiac diseases.

The invention claimed is:

1. A method of producing a combined image comprising information from a first diagnostic image and a second diagnostic image, wherein areas of increased uptake are identified in the second diagnostic image as a region of interest which contains pixels representing the areas of increased uptake, the method comprising the act of:

mapping the areas of increased uptake in the second diagnostic image onto equivalent areas in the first diagnostic image using a deviation value calculated from a difference of a first peak and a second peak in a histogram of pixel intensities and frequencies of said pixels; wherein said first peak is a first significant peak of said histogram and has a first intensity value, and said second peak corresponds to a second frequency which is half frequency of the first peak and has a corresponding second intensity value.

2. The method as claimed in claim 1, wherein the areas of increased uptake in the second diagnostic image are identified as being those areas containing pixels whose intensity values are at least a threshold value.

3. The method as claimed in claim 2, wherein the threshold value is calculated by:

computing the histogram defined by the region of interest, said histogram showing the first significant peak of intensity values, applying a low pass filter to the histogram, calculating the first intensity value of the first significant peak in the histogram, calculating the deviation value as an absolute value of the first intensity value minus the second intensity value, calculating a threshold value as a function of the first intensity value of the first significant peak and the deviation value.

4. The method as in claim 3, wherein the threshold value is calculated by taking the sum of the first intensity value of the first significant peak and at least 2 times the deviation value.

5. The method as in claim 1, wherein the first diagnostic image is a cardiac magnetic resonance image displaying first pass data and the second diagnostic image is a late enhancement cardiac magnetic resonance image.

6. The method as in claim 1, wherein the first diagnostic image is a cardiac magnetic resonance image displaying functional data and the second diagnostic image is a late enhancement cardiac magnetic resonance image.

7. The method as in claim 1, wherein the first diagnostic image is an ultrasound image displaying first pass data and the second diagnostic image is a late enhancement ultrasound image.

8. A computer readable medium embodying a computer program, comprising instructions for the display of images, wherein, the computer program also comprises instructions to produce a combined image comprising information from a first diagnostic image and a second diagnostic image, wherein areas of increased uptake are identified in the second diagnostic image as a region of interest which contains pixels representing the areas of increased uptake, and the areas of increased uptake in the second diagnostic image are mapped onto equivalent areas in the first diagnostic image using a deviation value calculated from a difference of a first intensity value of a first peak position and a second intensity value of a second peak position of pixel values of said pixels; wherein said first peak position is a first significant peak of intensity values of said pixels, and said second intensity value corresponds to a second frequency which is half frequency of the first peak.

9. A workstation, configured for the purposes of displaying images, wherein, the workstation also comprises instructions to produce a combined image comprising information from a first diagnostic image and a second diagnostic image, wherein areas of increased uptake are identified in the second diagnostic image as a region of interest which contains pixels representing the areas of increased uptake, and the areas of increased uptake in the second diagnostic image are mapped onto equivalent areas in the first diagnostic image using a deviation value calculated from a difference of a first intensity value of a first peak position and a second intensity value of a second peak position of pixel values of said pixels; wherein said first peak position is a first significant peak of intensity values of said pixels, and said second intensity value corresponds to a second frequency which is half frequency of the first peak.

10. The workstation as claimed in claim 9, wherein, the areas of increased uptake in the second diagnostic image are identified as being those areas containing pixels whose intensity values are at least a threshold value.

11. The workstation as claimed in claim 10, wherein the threshold value is calculated by:
computing a histogram of the pixel values defined by the region of interest, said histogram showing the first significant peak of intensity values,
applying a low pass filter to the histogram,
calculating the first intensity value of the first significant peak in the histogram,
calculating the deviation value as an absolute value of the first intensity value minus the second intensity value,
calculating a threshold value as a function of the first intensity value of the first significant peak and the deviation value.

12. The workstation as in claim 11, wherein the threshold value is calculated by taking the sum of the first intensity value of the first significant peak and at least 2 times the deviation value.

13. The workstation as in claim 9, wherein the first diagnostic image is a cardiac magnetic resonance image displaying first pass data and the second diagnostic image is a late enhancement cardiac magnetic resonance image.

14. The workstation as in claim 9, wherein the first diagnostic image is a cardiac magnetic resonance image displaying functional data and the second diagnostic image is a late enhancement cardiac magnetic resonance image.

15. The workstation as in claim 9, wherein the first diagnostic image is an ultrasound image displaying first pass data and the second diagnostic image is a late enhancement ultrasound image.

16. The computer readable medium as claimed in claim 8, wherein the areas of increased uptake in the second diagnostic image are identified as being those areas containing pixels whose intensity values are at least a threshold value.

17. The computer readable medium as claimed in claim 16, wherein the threshold value is calculated by:
computing a histogram of the pixel values defined by the region of interest, said histogram showing the first significant peak of intensity values,
applying a low pass filter to the histogram,
calculating the first intensity value of the first significant peak in the histogram,
calculating the deviation value as an absolute value of the first intensity value minus the second intensity value,
calculating a threshold value as a function of the first intensity value of the first significant peak and the deviation value.

18. The computer readable medium as in claim 17, wherein, the threshold value is calculated by taking the sum of the first intensity value of the first significant peak and at least 2 times the deviation value.

* * * * *